MAGNETIC CORES
Filed Jan. 7, 1958

INVENTOR.
JOSEPH J. SACCO, JR.
BY J. L. Whittaker
ATTORNEY

United States Patent Office 3,031,406

Patented Apr. 24, 1962

3,031,406

MAGNETIC CORES

Joseph J. Sacco, Jr., Jamaica Plain, Mass., assignor to Radio Corporation of America, a corporation of Delaware Filed Jan. 7, 1958, Ser. No. 707,560

6 Claims. (Cl. 252—62.5)

This invention relates to improved magnetic cores and particularly, but not necessarily exclusively, to improved ceramic bodies of sintered metallic oxides having unexpected and useful magnetic properties and to methods of manufacture thereof.

The term "spinel" generally refers to a class of materials having the molar formula $M^{2+}(M^{3+})_2O_4$ and having a spinel crystal structure. $M^{2+}$ may be one or more divalent cations. $M^{3+}$ may be one or more trivalent cations. A "single spinel" is a spinel in which $M^{2+}$ is a single divalent cation and $M^{3+}$ is a single trivalent cation. A "mixed spinel" is a spinel in which either or both $M^{2+}$ comprises more than one divalent cation or $M^{3+}$ comprises more than one trivalent cation. A mixed spinel may also be defined as a single homogeneous material comprising two or more single spinels in a solid solution. The ferromagnetic spinels are also referred to as "ferrospinels." The term "ferrites" is most generally used to refer to sintered polycrystalline bodies or cores consisting essentially of spinel crystallites. The term "ferrites," however, includes also bodies of crystallites other than spinels.

Many magnetic cores of mixed ferrospinels exhibit highly non-linear magnetic hysteresis characteristics which are said to be "rectangular" loops or "square" loops. Upon applying a magnetic field, such a body or core assumes one of two definite identifiable stable states of remanent magnetization. The core can be changed or switched to the other stable state by applying thereto a reverse magnetic field greater than the coercive force of the core. Cores which require a relatively large magnetic field for switching from one state to the other are referred to as high drive cores. Cores which require relatively small magnetic fields for switching from one state to the other are referred to as low drive cores.

Magnetic cores with substantially rectangular magnetic hysteresis characteristics are useful in shift registers, magnetic switching devices and in magnetic memory devices. For such uses, a ferrospinel core should have the following characteristics:

(*a*) It should require relatively small magnetic fields (low-drive) for switching from one stable state of remanent magnetization to the other in order to reduce the power consumption for switching.

(*b*) It should exhibit optimum rectangularity so that there is a maximum discrimination between the stable states and so that the remanent magnetization is not altered by applying a magnetic field less than the coercive force. The degree of rectangularity is generally measured by the ratio of remanent magnetization to the magnetization at saturation. The ratio is preferably 0.85 or greater.

(*c*) It should provide an optimum voltage output upon switching from one stable state of remanent magnetization to the other.

(*d*) It should exhibit a fast switching time from one stable state of remanent magnetization to the other, so that the core will be capable of more operations per unit of time and so that the switching field need be applied for only a minimum period of time. Preferably, the switching time should be 3.0 microseconds or less for coincident current memory applications.

An object of this invention is to provide improved magnetic cores.

Another object is to provide improved methods for manufacturing magnetic cores of mixed ferrospinels.

A further object is to provide improved magnetic bodies of mixed spinels exhibiting highly rectangular magnetic hysteresis characteristics, relatively high output upon switching, and a relatively fast switching time.

In general, the improved magnetic cores herein each comprise a ceramic of sintered crystallites, said crystallites consisting essentially of a mixed spinel having the molar composition:

$$(Mg_yMn_{0.186}Zn_x)(Fe_{0.857}Mn_{0.143})_2O_4$$

where $x=0.214$ to $0.321$ and $y=0.814-x$.

The improved mixed ferrospinel bodies of the invention may be prepared by calcining in air at about 900 to 1100° C. an intimate physical mixture consisting essentially of:

| | Mol percent |
|---|---|
| MgO | 23 to 28 |
| MnO | 22 |
| ZnO | 10 to 15 |
| $Fe_2O_3$ | 40 |

The calcine is compacted to a coherent body and then sintered at about 1200 to 1300° C. The body may be sintered in a neutral atmosphere or may be sintered in air and then annealed in a neutral atmosphere.

The invention is described in greater detail by reference to the accompanying drawings in which.

*Example 1*

Figures 1, 2, 3, 4:
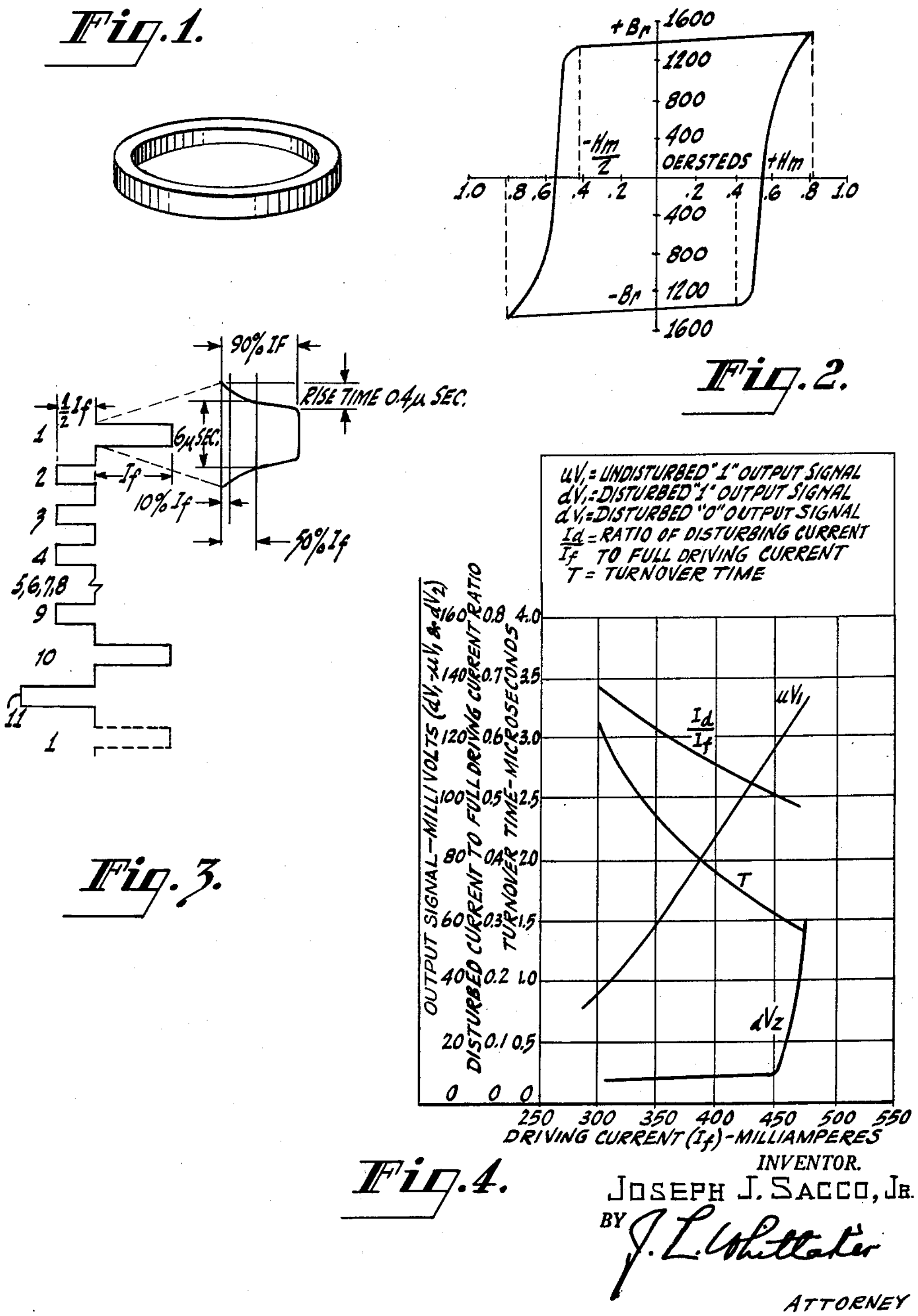
FIGURE 1 is a magnetic core of the invention in the shape of a toroid.
FIGURE 2 is a typical hysteresis loop for one of the mixed ferrospinel bodies herein.
FIGURE 3 is a magnetizing pulse program simulating operation of a typical ferrospinel body herein in a coincident current magnetic memory device.
FIGURE 4 is a family of curves illustrating the operating characteristics of a typical mixed ferrospinel body of the invention.

A preferred magnetic core of the invention may be prepared by the following procedure. Mix and calcine in air for one hour at about 525° C. the following composition.

| Mol percent | Weight percent | |
|---|---|---|
| 27 | 11.41 | MgO, as magnesium carbonate, Mallinkrodt SL powder. |
| 22 | 15.78 | MnO, as $MnCO_3$, Baker's analyzed reagent grade. |
| 10 | 8.23 | ZnO, as ZnO, Baker's analyzed reagent grade. |
| 40 | 64.58 | $Fe_2O_3$, as Mapico Red $Fe_2O_3$, No. 110-2. |

The calcine is ground, dried, and screened. The screened calcine is recalcined for about one hour in air at about 900° C. The recalcined batch is reground and about 3 weight percent of a suitable binder is added. The recalcined batch with binder added is screened through an 80 mesh screen. The recalcined batch is then pressed into toroids. The pressed toroids are then sintered for about 10 hours in air at about 1275° C. The sintered toroids are cooled to room temperature, annealed for one hour in dry prepurified nitrogen at about 1050° C. and then cooled to room temperature.

Referring to FIGURE 1, the toroids of Example 1 comprise a shaped magnetic core body consisting essentially of spinel crystals of the molar composition $$(Mg_{0.600}Mn_{0.186}Zn_{0.214})(Fe_{0.857}Mn_{0.143})_2O_4$$

Typical test results for the cores of Example 1 are as follows:

| | | |
|---|---|---|
| Full drive | ma. | 360 |
| Disturbed drive | ma. | 220 |
| "1" output | mv. | 46 |
| Disturbed "0" output | mv. | 12 |
| Switching time | μs. | 2.5 |
| Current rise time | μs. | 0.5 |
| Pulse length | μs. | 10 |

A typical hysteresis loop for toroids prepared according to Example 1 are illustrated in FIGURE 2. A typical toroid has the following dimensions:

| | |
|---|---|
| Outside diameter | 0.080"±0.003" |
| Inside diameter | 0.050"±0.003" |
| Thickness | 0.025"±0.0025" |

Typical static characteristics at an ambient temperature of about 25° C. are:

| | | |
|---|---|---|
| Magnetizing force ($H_m$) required for optimum squareness | oersted | 0.82 |
| Maximum flux density ($B_m$) | gausses | 1500 |
| Maximum remanent flux density ($B_r$) | do | 1400 |
| Coercive force ($H_c$) | oersted | 0.55 |
| Squareness ratio ($R_s$) | | 0.85 |

The basic operation of a core may be explained in terms of the hysteresis loop shown in FIGURE 2. Let the $-B_r$ flux state be defined as "1" and the $+B_r$ flux state be defined as "0."

If a current pulse of sufficient amplitude and $-H_m$ polarity is applied to a core, the pulse will leave the core in the $-B_r$ state and write a "1." With the core in the "1" state, application of a pulse of sufficient amplitude and $+H_m$ polarity will switch the core to its "0" state. A change in state (magnetization) of the core will cause a large change in flux and, consequently, a high output voltage. This large output voltage is the read "1" output signal. Because the core is set to the "0" state when a read "1" output signal is produced, reading a "1" writes a "0." If another $+H_m$ pulse of the same amplitude as the original $+H_m$ pulse is applied to the core which is now in its "0" state, the core will produce a small change in flux and, consequently, a low output voltage. This low output voltage is the read "0" output signal.

To be suitable for use in coincident-current applications, a core must have magnetic properties such that when the core is in either the "1" or the "0" state, the core will not reverse its flux when a magneto-motive force equal to one-half the pulse required to switch the core $$\left(\frac{+H_m}{2} \text{ or } \frac{-H_m}{2}\right)$$

is applied. In addition, there should be little change in flux and very low output voltage during the excursion of the flux. Thus, if a series of $$\frac{+H_m}{2}$$

pulses is applied, slight degradation of the $-B_r$ state should occur only with the first few pulses, after which no further change should occur. This state is called the disturbed "1" ($dV_1$). Conversely, the application of $$\frac{-H_m}{2}$$

pulses to a core in the $+B_r$ state produces a disturbed "0" state ($dV_z$).

The pulse program shown in FIGURE 3 produces the following sequence of events: Pulse No. 1 "reads" an undisturbed "1" output signal ($uV_1$), which was written by pulse No. 11 of the previous cycle. When pulse No. 1 is completed, the core is left in its "0" state. Pulses No. 2 through No. 9 are partial pulses which disturb the "0" state, but do not switch the core. Pulse No. 10 returns the core to its undisturbed "0" state and reads the disturbed "0" output signal ($dV_z$). Pulse No. 11 switches the core and "writes" a "1." By omitting pulse No. 10 from the program, the flux change caused by pulse No. 11 produces a disturbed "1" ($dV_1$) output signal.

FIGURE 4 is a family of curves for the typical mixed ferrospinel core prepared according to Example 1. The relationships shown in FIGURE 4 permit quick evaluation of the performance of the core with any selected value of full driving current. For example, a full driving current of 400 ma. will produce an undisturbed "1" output signal ($uV_1$) of 88 millivolts peak, a disturbed "0" output signal ($dV_z$) of 8 millivolts peak, and a switching time 2.3 microseconds. The $I_d/I_f$ ratio will be 0.56 which indicates that disturbing pulse amplitudes up to 224 ma. can be tolerated without impairing operation of the core.

The magnesium manganese ferrites with a cubic spinel structure have been reported as having rectangular hysteresis characteristics. It has also been reported that up to 5 weight percent of zinc oxide may be added to a cubic magnesium manganese ferrite without affecting the desired properties. See for example, Australian Patent No. 158,-857 and British Patent No. 697,219.

The invention herein is based on the discovery that magnetic cores of certain magnesium-manganese-zinc spinels containing between 10 and 15 mol percent zinc oxide possess unusual and unexpected magnetic properties particularly useful for low-drive applications in magnetic memories.

The magnetic cores herein are limited to the following compositional ranges in mol percent:

| | |
|---|---|
| MgO | 23 to 28 |
| MnO | 22 |
| ZnO | 10 to 15 |
| $Fe_2O_3$ | 40 |

The raw batch may be prepared of the foregoing oxides or of compounds which yield the foregoing oxides by chemical reaction during calcining or firing of the batch. A high degree of purity is desirable, preferably the "chemically pure" grade of chemicals.

In Example 1, the steps of mixing, calcining at 525° C., grinding, drying, and screening are designed to provide an intimate mixture of the ingredients and for the removal of the gases, water, and organic matter. These steps are not critical. Any procedure which provides a dry, intimate mixture of the ingredients is satisfactory.

In Example 1, recalcining at about 900° C. is important. The recalcining temperature may be between 900° C. and 1100° C., but preferably at the lower end of the range. The recalcining time is not critical, although shorter times should be used with higher recalcining temperatures. Air is the preferred recalcining atmosphere although other atmospheres having oxidizing characteristics similar to air at the recalcining temperature may also be used.

In Example 1, regrinding the calcine, addition of a binder, rescreening, and pressing are not critical to the magnetic properties of the final product. However, a proper selection should be made to obtain the desired shape and size of product with a minimum of distortion. Besides toroids, other shapes such as magnetic memory plates may be prepared. See a description of processes in G. S. Hipskind and T. Q. Dziemianowicz, "Processing and Testing Rectangular Loop Cores," RCA Engineer, volume 2, No. 6, April-May 1957, pages 9 to 13.

In Example 1, the sintering temperature should be between 1200° C. and 1300° C. The zinc oxide volatilizes excessively above 1300° destroying the compositional proportions. Below 1200° C., the composition remains insufficiently reacted. The sintering time is not critical. Any sintering time sufficient for complete reaction is adequate. Ten hours has been found to be a convenient firing time.

The sintering atmosphere is of great importance. In Example 1, the toroids are fired at about 1275° C. in air, cooled to room temperature and then annealed for one hour in dry pre-purified nitrogen at about 1025 to 1150° C. By this procedure the sintering atmosphere is not critical. However, during the annealing, the atmosphere is critical since it determines the relative oxidation states of the constituents of the compositions. It has been found that a neutral atmosphere such as is provided with nitrogen, argon, helium or mixtures of various gases, is necessary. With such atmospheres, the annealing temperature may be selected from the range between 1025° C. and 1150° C. The annealing time is not critical, one hour being a convenient time.

Alternative to sintering and then annealing, the bodies herein may be prepared by sintering in a neutral atmosphere and omitting the annealing step. By this procedure magnetic cores with similar characteristics are produced. However, this technique requires more careful control of all of the parameters during sintering. In this technique, it is preferred to sinter the cores between 1250° C. and 1300° C. in a prepurified nitrogen atmosphere for 6 to 8 hours.

*Example 2*

Follow the procedure of Example 1 except substitute the following raw batch composition:

| | Mol percent | Weight percent |
|---|---|---|
| MgO | 25.5 | 10.29 |
| MnO | 22.0 | 15.61 |
| ZnO | 12.5 | 10.18 |
| $Fe_2O_3$ | 40.0 | 63.92 |

Typical test results from magnetic cores prepared according to Example 2 are as follows:

| | | |
|---|---|---|
| Full drive ma | 200 | 150 |
| Disturbed drive ma | 100 | 75 |
| One output mv | 18 | 8 |
| Disturbed zero output mv | 4 | 4 |
| Switching time μs | 7.3 | 13.0 |

The cores of Example 2 can operate at currents low enough for transistor drive applications. The sintered mixed ferrospinel body of Example 2 has the molar composition $(Mg_{0.547}Mn_{0.186}Zn_{0.267})(Fe_{0.857}Mn_{0.143})_2O_4$.

*Example 3*

Follow the procedure of Example 1 except substitute the following raw batch:

| | Mol percent |
|---|---|
| MgO | 23 |
| MnO | 22 |
| ZnO | 15 |
| $Fe_2O_3$ | 40 |

There have been described low-drive ferrospinel bodies having substantially rectangular hysteresis characteristics which provide an optimum voltage output and a relatively fast switching time. There have also been described methods for preparing the ferrospinel bodies of the invention.

What is claimed is:

1. A process for preparing a mixed ferrospinel having a substantially rectangular magnetic hysteresis loop comprising calcining at about 900° to 1100° C. an intimate physical mixture consisting essentially of:

| | Mol percent |
|---|---|
| MgO | 23 to 28 |
| MnO | 22 |
| ZnO | 10 to 15 |
| $Fe_2O_3$ | 40 |

compacting said calcine to a coherent body, sintering said compacted body at about 1250° to 1300° C. in an atmosphere selected from the group consisting of nitrogen, argon, helium, and mixtures thereof.

2. A process for preparing a mixed ferrospinel having a substantially rectangular magnetic hysteresis loop comprising calcining at about 900° to 1100° C. an intimate physical mixture consisting essentially of:

| | Mol percent |
|---|---|
| MgO | 23 to 28 |
| MnO | 22 |
| ZnO | 10 to 15 |
| $Fe_2O_3$ | 40 |

compacting said calcine to a coherent body, sintering said compacted body at about 1200° to 1300° C. in air, annealing said sintered body at about 1025° to 1150° C. in an atmosphere selected from the group consisting of nitrogen, argon, helium, and mixtures thereof.

3. A process for preparing a mixed ferrospinel having a substantially rectangular magnetic hysteresis loop comprising calcining at about 900° C. an intimate physical mixture consisting essentially of:

| | Mol percent |
|---|---|
| MgO | 23 to 28 |
| MnO | 22 |
| ZnO | 10 to 15 |
| $Fe_2O_3$ | 40 |

grinding said calcine, compacting said calcine to a coherent body, sintering said compacted body for about 10 hours at about 1250° C. in air, cooling said sintered body, annealing said sintered body for about 1 hour at about 1050° C. in nitrogen.

4. A process for preparing a mixed ferrospinel having a substantially rectangular magnetic hysteresis loop comprising calcining at about 900° C. an intimate physical mixture consisting essentially of:

| | Mol percent |
|---|---|
| MgO | 28 |
| MnO | 22 |
| ZnO | 10 |
| $Fe_2O_3$ | 40 |

compacting said calcine to a coherent body, sintering said compacted body for about 10 hours at about 1250° C. in air and then annealing said sintered body for about 1 hour at about 1050° C. in nitrogen.

5. A process for preparing a mixed ferrospinel having a substantially rectangular magnetic hysteresis loop comprising calcining at about 900° to 1100° C. an intimate physical mixture consisting essentially of:

| | Mol percent |
|---|---|
| MgO | 25.5 |
| MnO | 22 |
| ZnO | 12.5 |
| $Fe_2O_3$ | 40 |

compacting said calcine to a coherent body, sintering said compacted body for about 10 hours at about 1250° C. in air and then annealing said sintered body for about 1 hour at about 1050° C. in nitrogen.

6. A process for preparing a mixed ferrospine having a substantially rectangular magnetic hysteresis loop comprising calcining at about 900° C. an intimate physical mixture consisting essentially of:

| | Mol percent |
|---|---|
| MgO | 23 |
| MnO | 22 |
| ZnO | 15 |
| $Fe_2O_3$ | 40 |

grinding said calcine, compacting said calcine to a coherent body, sintering said compacted body for about 10 hours at about 1250° C. in air, and annealing said sintering body for about 1 hour at about 1050° C. in nitrogen.

References Cited in the file of this patent

UNITED STATES PATENTS 2,452,530 Snoek ---------- Oct. 26, 1948
2,575,099 Crowley ---------- Nov. 13, 1951
2,856,365 Heck et al. ---------- Oct. 14, 1958

(Other references on following page)

UNITED STATES PATENTS

| | | |
|---|---|---|
| 2,960,472 | Guillaud | Nov. 15, 1960 |
| 2,981,689 | Albers-Schoenberg | Apr. 25, 1961 |

FOREIGN PATENTS

| | | |
|---|---|---|
| 730,703 | Great Britain | May 25, 1955 |
| 735,375 | Great Britain | Aug. 17, 1955 |
| 1,033,268 | France | Apr. 1, 1953 |
| 1,074,829 | France | Apr. 7, 1954 |
| 1,128,209 | France | Aug. 25, 1955 |
| 1,128,416 | France | Aug. 27, 1956 |

OTHER REFERENCES

Fresh: Proceedings of the IRE, October 1956, pp. 1303–1311.

Harvey et al.: RCA Review, September 1950, pp. 344–347.

Economos: J. Amer. Ceramic Soc., August 1955, pp. 292–297.

Gorter: Proceedings of the IRE, December 1955, p. 1960.

UNITED STATES PATENT OFFICE

CERTIFICATE OF CORRECTION

Patent No. 3,031,406 April 24, 1962

Joseph J. Sacco, Jr.

It is hereby certified that error appears in the above numbered patent requiring correction and that the said Letters Patent should read as corrected below.

Column 2, in the table, column 1, line 1 thereof, for "27" read -- 28 --.

Signed and sealed this 4th day of September 1962.

(SEAL)
Attest:

ERNEST W. SWIDER
Attesting Officer

DAVID L. LADD
Commissioner of Patents